(12) United States Patent
Goble et al.

(10) Patent No.: US 12,384,261 B2
(45) Date of Patent: Aug. 12, 2025

(54) VEHICLE CHARGING SYSTEMS AND METHODS OF POSITIONING A CHARGING CABLE TO ENGAGE A CHARGING ADAPTER

(71) Applicant: Volley Automation, Inc., Denver, CO (US)

(72) Inventors: Jos Christopher Goble, Milpitas, CA (US); David Edwin Weldon, Gilroy, CA (US); Connor James Anderson, Alameda, CA (US)

(73) Assignee: VOLLEY AUTOMATION, INC., Denver, CO (US)

( * ) Notice: Subject to any disclaimer, the term of this patent is extended or adjusted under 35 U.S.C. 154(b) by 394 days.

(21) Appl. No.: 17/858,251

(22) Filed: Jul. 6, 2022

(65) Prior Publication Data

US 2024/0010082 A1   Jan. 11, 2024

(51) Int. Cl.
| | |
|---|---|
| *B60L 53/16* | (2019.01) |
| *B60L 53/18* | (2019.01) |
| *B60L 53/36* | (2019.01) |
| *H01R 13/66* | (2006.01) |
| *H01R 103/00* | (2006.01) |

(52) U.S. Cl.
CPC ............... *B60L 53/16* (2019.02); *B60L 53/18* (2019.02); *B60L 53/36* (2019.02); *H01R 13/665* (2013.01); *H01R 2103/00* (2013.01); *H01R 2201/26* (2013.01)

(58) Field of Classification Search
CPC .......... B60L 53/16; B60L 53/18; B60L 53/36; B60L 53/37; H01R 13/665; H01R 2103/00; H01R 2201/26; Y02T 10/70; Y02T 10/7072; Y02T 90/14
See application file for complete search history.

(56) References Cited

U.S. PATENT DOCUMENTS

| | | | | |
|---|---|---|---|---|
| 5,369,352 | A * | 11/1994 | Toepfer ................... | B60L 53/14 320/110 |
| 9,482,255 | B2 * | 11/2016 | Changsrivong ....... | F16B 21/186 |
| 10,052,962 | B2 * | 8/2018 | Dunger ................. | B60L 53/305 |

(Continued)

FOREIGN PATENT DOCUMENTS

| | | |
|---|---|---|
| CN | 204791290 U | 11/2015 |
| CN | 106114268 B | 4/2019 |

(Continued)

OTHER PUBLICATIONS

International Search Report and Written Opinion pertaining to application No. PCT/US2023/017506 dated Jul. 14, 2023, 16 pages.

*Primary Examiner* — Travis S Chambers
(74) *Attorney, Agent, or Firm* — Dinsmore & Shohl

(57) ABSTRACT

A vehicle charging adapter including a connector configured to engage with a charging port of a vehicle, and a receiver coupled to the connector. The receiver includes a receiver charging surface, an indicator provided on the receiver charging surface, an inner radial wall extending from the receiver charging surface and defining a receiver cavity extending along an insertion axis, and one or more receiver electrical contacts provided on the inner radial wall within the receiver cavity. The one or more receiver electrical contacts are electrically connected to the connector.

12 Claims, 11 Drawing Sheets

(56) References Cited

U.S. PATENT DOCUMENTS

| | | | | |
|---|---|---|---|---|
| 2007/0117433 A1* | 5/2007 | Pavlovic | ............... | H01R 24/58 |
| | | | | 439/188 |
| 2009/0149053 A1* | 6/2009 | Chansrivong | ........ | H01R 13/533 |
| | | | | 439/349 |
| 2014/0259617 A1* | 9/2014 | Kompa | ................... | B23P 11/00 |
| | | | | 267/167 |
| 2022/0055491 A1 | 2/2022 | Labell et al. | | |
| 2022/0055495 A1* | 2/2022 | Labell | ..................... | B60L 53/37 |
| 2024/0109440 A1* | 4/2024 | Miler | ..................... | B60L 53/66 |
| 2024/0186756 A1* | 6/2024 | Skriba | ................... | H01R 13/52 |

FOREIGN PATENT DOCUMENTS

| | | | | |
|---|---|---|---|---|
| CN | 108437826 B | 3/2020 | | |
| CN | 111284343 A | 6/2020 | | |
| CN | 113511087 A | 10/2021 | | |
| EP | 2258582 A2 | 12/2010 | | |
| EP | 3261188 B1 * | 9/2020 | ............ | H01R 13/04 |
| JP | 2011117155 A | 6/2011 | | |
| JP | 20210155834 A | 12/2021 | | |
| KR | 20180065844 A | 6/2018 | | |

\* cited by examiner

VEHICLE CHARGING SYSTEMS AND METHODS OF POSITIONING A CHARGING CABLE TO ENGAGE A CHARGING ADAPTER

TECHNICAL FIELD

The present specification generally relates to charging systems and, more specifically, charging systems for electric vehicles.

BACKGROUND

Automated parking systems may be used to automatically park a vehicle in a parking structure. The automated parking systems may transport vehicles to various spots in the parking structure. Additionally, a user may desire to charge their vehicle while parked in the parking structure. However, various charging port locations on different vehicles make it difficult to automate vehicle charging when the vehicles are parked in the parking structure.

SUMMARY

In one embodiment, a vehicle charging adapter includes a connector configured to engage with a charging port of a vehicle, and a receiver coupled to the connector. The receiver includes a receiver charging surface, an indicator provided on the receiver charging surface, an inner radial wall extending from the receiver charging surface and defining a receiver cavity extending along an insertion axis, and one or more receiver electrical contacts provided on the inner radial wall within the receiver cavity. The one or more receiver electrical contacts are electrically connected to the connector.

In another embodiment, a vehicle charging system includes a vehicle charging adapter, a plunger, and a charging cable. The adapter includes a connector configured to engage with a charging port of a vehicle, and a receiver coupled to the connector. The receiver includes a receiver charging surface, an indicator provided on the receiver charging surface, an inner radial wall extending from the receiver charging surface and defining a receiver cavity extending along an insertion axis, and one or more receiver electrical contacts provided on the inner radial wall within the receiver cavity, the one or more receiver electrical contacts are electrically connected to the connector. The plunger includes an insertion member extending from a plunger charging plate along the insertion axis, the insertion member at least partially positionable into the receiver cavity of the receiver, and one or more plunger electrical contacts that mate with the one or more receiver electrical contacts when the insertion member is positioned within the receiver cavity. The charging cable transfers electrical current to the one or more plunger electrical contacts of the plunger.

In yet another embodiment, a method includes detecting a location of an adapter extending from a charging port of a vehicle, positioning a plunger relative to the adapter such that the plunger is positioned above the receiver of the adapter along an insertion axis, and lowering the plunger along the insertion axis such that the insertion member is positioned within the receiver cavity of the receiver and the one or more plunger electrical contacts of the plunger engage the one or more receiver electrical contacts of the receiver. The adapter includes a receiver coupled to the connector, the receiver including a receiver charging surface, an indicator provided on the receiver charging surface, an inner radial wall extending from the receiver charging surface and defining a receiver cavity extending along an insertion axis, and one or more electrical contacts provided on the inner radial wall within the receiver cavity, the one or more electrical contacts electrically connected to the connector. The plunger includes an insertion member extending from the plunger charging plate along the insertion axis, the insertion member at least partially positionable into the receiver cavity of the receiver, one or more plunger electrical contacts that mate with the one or more receiver electrical contacts when the insertion member is positioned within the receiver cavity, and a charging cable transferring electrical current to the one or more plunger electrical contacts.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
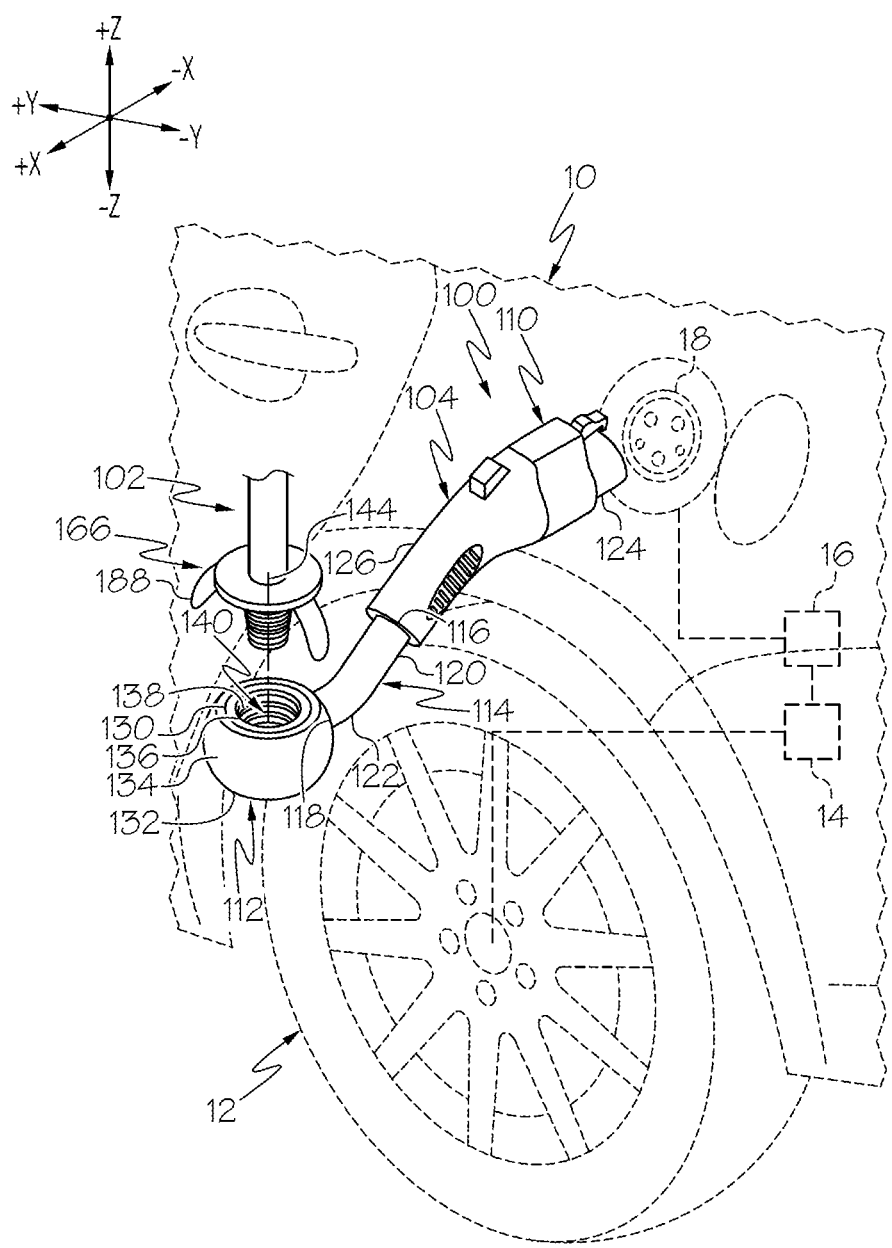
FIG. 1 schematically depicts a partial environmental view of a vehicle charging system, according to one or more embodiments shown and described herein.

FIG. 1 generally depicts one embodiment of a vehicle charging system for charging an electric vehicle. The vehicle charging system generally includes a plunger connected to an electric vehicle charging station, a vehicle charging adapter, a gantry for maneuvering the plunger, and a control system for controlling the vehicle charging system. The plunger is connected to a current source that provides electrical current to the plunger and is configured to engage the adapter to transfer current to the adapter. The adapter is configured to engage a charging port on the electric vehicle to transfer current from the plunger to a vehicle battery connected to the charging port. The control system is configured to locate the adapter and operate the gantry to move the plunger into the adapter.

The vehicle charging system may be used in conjunction with an automated parking system for automatically parking vehicles within a parking structure. The automated parking system may use a lift that picks up and transports the vehicle to a parking space in the parking structure. A driver can insert the adapter into a charging port of the vehicle before the vehicle is transported to the parking structure. Once the vehicle is automatically parked in the parking structure by the automatic parking system, the gantry can automatically insert the plunger into the adapter to begin charging the vehicle. Various embodiments of the vehicle charging system and the operation of the vehicle charging system will be described in more detail herein.

As used herein, the term "longitudinal direction" refers to the forward-rearward direction of the vehicle (i.e., in the +/−Y-direction depicted in FIG. 1). The term "lateral direction" refers to the cross-vehicle direction (i.e., in the +/−X-direction depicted in FIG. 1), and is transverse to the longitudinal direction. The term "vertical direction" or "above" or "below" refer to the upward-downward direction of the vehicle (i.e., in the +/−Z-direction depicted in FIG. 1).

Referring now to FIG. 1, a vehicle charging system 100 for an electric vehicle 10 is depicted. The electric vehicle 10 may include one or more wheels 12, one or more motors 14 operatively coupled to the one or more wheels 12 to drive the wheels 12, a battery 16 operatively coupled to the motors 14 to provide current to the motors 14, and a charging port 18 operatively coupled to the battery 16 to transfer current to the battery 16. While FIG. 1 depicts the electric vehicle 10 as a passenger vehicle, such as a car or SUV, it is contemplated and possible that the electric vehicle 10 is any vehicle having a battery 16 that supplies current to motors that assist in driving the wheels 12 of the vehicle 10, such as, for example, a hybrid vehicle. The charging port 18 may be any traditional charging port for transferring current from an electric vehicle charger, or charging station 50 (FIG. 4), to the battery 16 of the electric vehicle 10. For example, the charging port 18 may be a type 1 or type 2 AC connector type charging port. Alternatively, the charging port 18 may be a DC type charging port.

Figure 2:
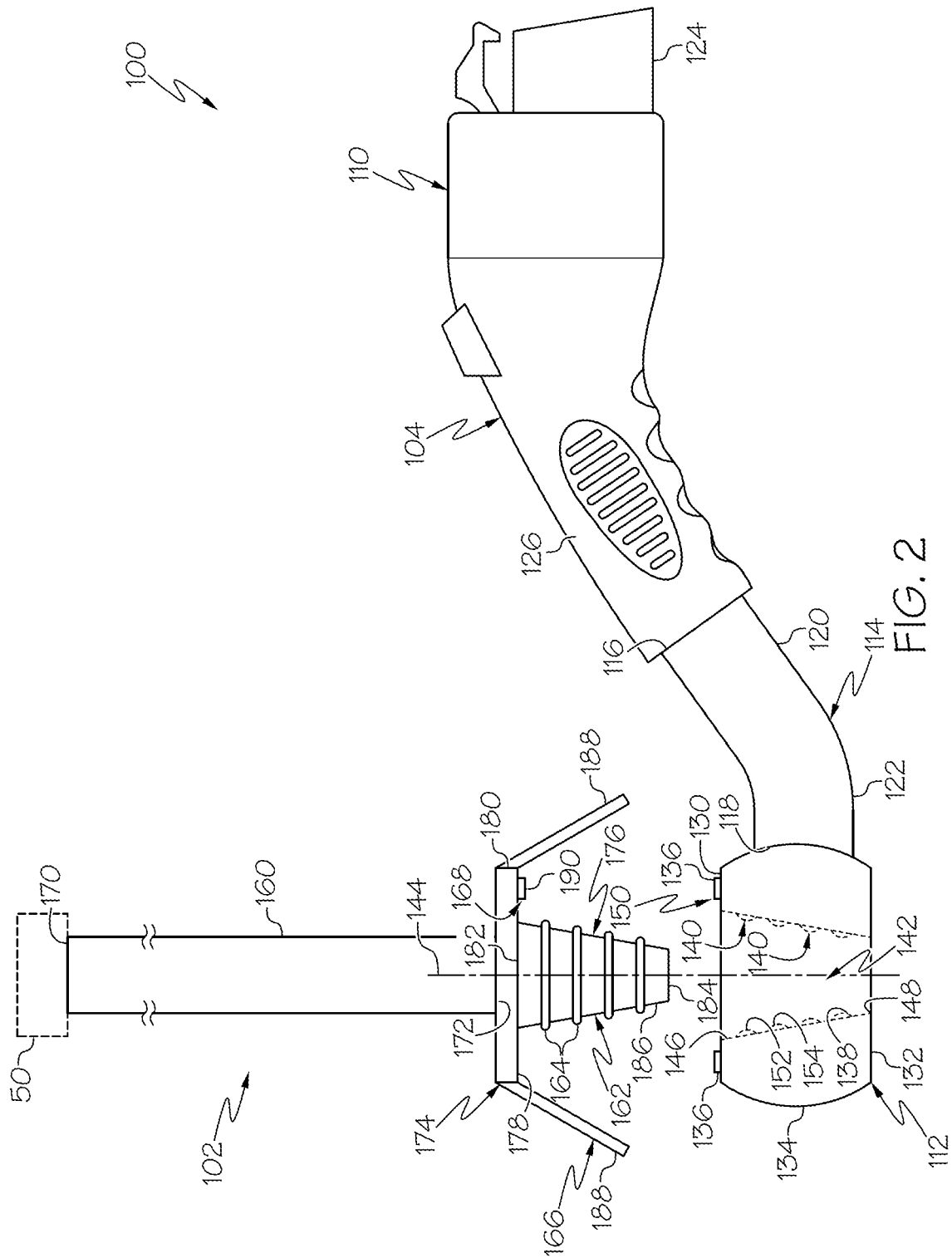
FIG. 2 schematically depicts a side view of the vehicle charging system of FIG. 1 with the vehicle charging system in a disengaged position, according to one or more embodiments shown and described herein.
Figure 3:
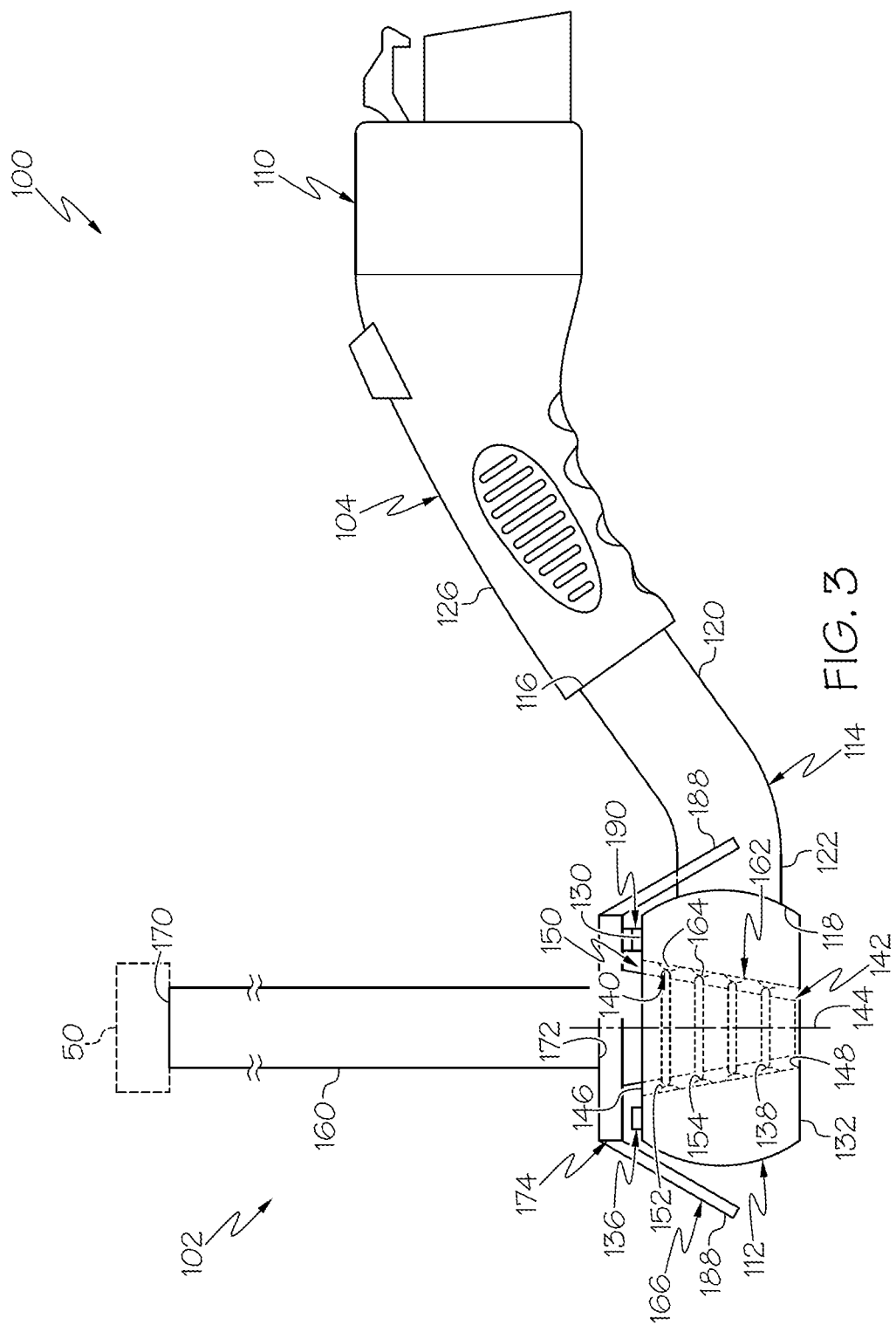
FIG. 3 schematically depicts a side view of the vehicle charging system of FIG. 2 with the vehicle charging system in an engaged position, according to one or more embodiments shown and described herein.
Figure 4:
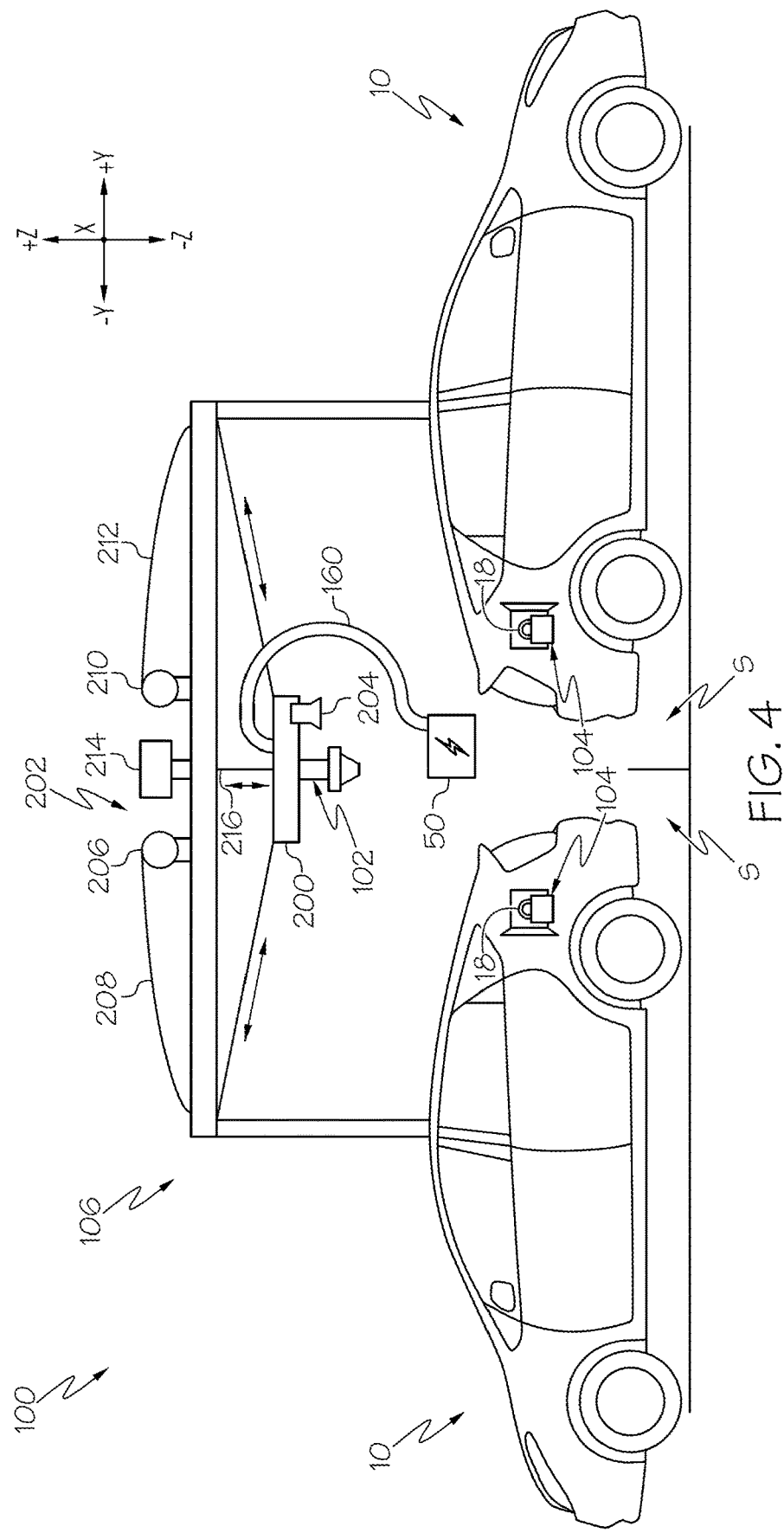
FIG. 4 schematically depicts a side view of the vehicle charging system of FIG. 1 including a gantry, according to one or more embodiments shown and described herein.
Figure 5:
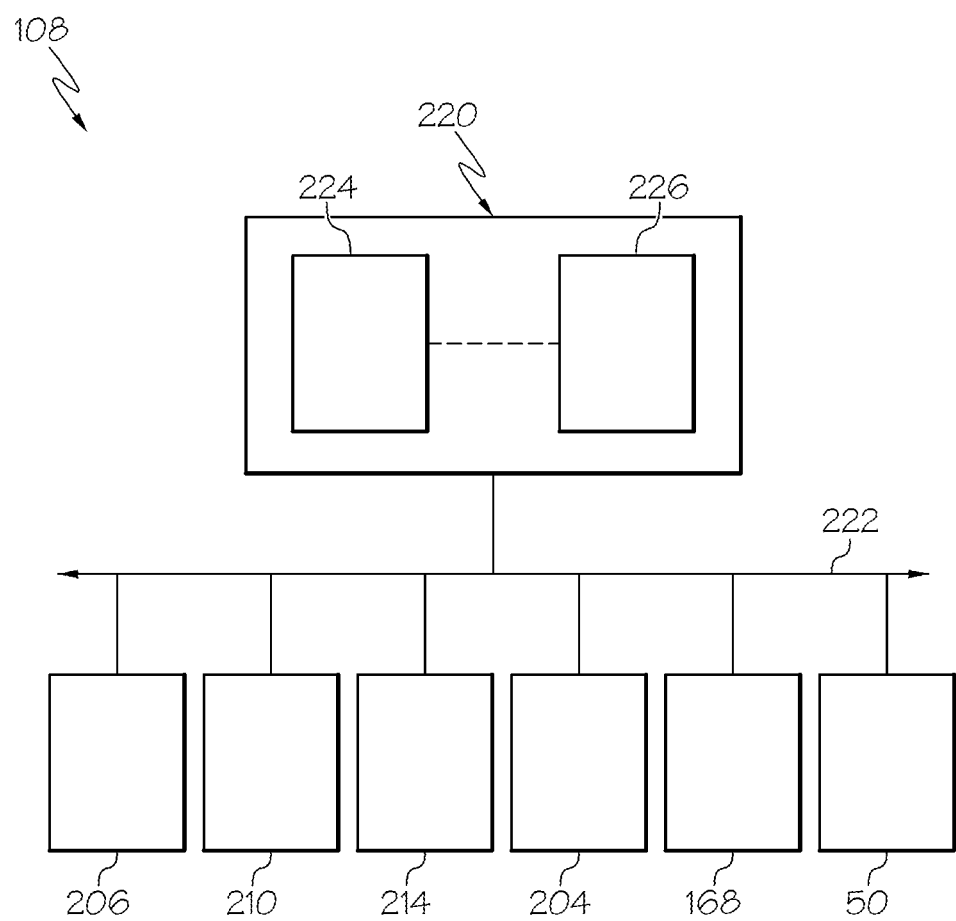
FIG. 5 schematically depicts a control system for operating the vehicle charging system of FIG. 1, according to one or more embodiments shown and described herein.

The vehicle charging system 100 may include a plunger 102, an adapter 104, a gantry 106 (FIG. 4), and a control system 108 (FIG. 5). Referring now to FIGS. 1-3, the adapter 104 may include a connector 110 configured to engage with the charging port 18 of the electric vehicle 10, a receiver 112 coupled to the connector 110, and a neck 114 extending between the receiver 112 and the connector 110. The neck 114 may include a first end 116 fixed to the connector 110 and an opposite second end 118 fixed to the receiver 112. The neck 114 may include a first portion 120 extending from the first end 116 toward the second end 118, and a second portion 122 extending from the first portion 120 to the second end 118. The second portion 122 may extend obliquely to the first portion 120. The distance that the neck 114 extends may be limited so that the adapter 104 does not extend from the charging port 18 a distance greater than a distance that a vehicle side mirror of the vehicle 10 extends in the vehicle lateral direction. In other words, the neck 114 may extend a predetermined distance such that the receiver 112 does not extend passed the vehicle side mirror in the vehicle lateral direction when the adapter 104 is attached to the charging port 18. However, it is contemplated and possible that the adapter 104 extends further than the vehicle side mirror. In embodiments, the vehicle 10 may include cameras instead of vehicle side mirrors. In such embodiments, the neck 114 may be sized so that the adapter 104 does not extend from the charging port 18 a distance greater than a distance the vehicle camera extends in the vehicle lateral direction.

The connector 110 may be a traditional charging connector for an electric vehicle 10, such as, for example, an SAE J1772 connector. The connector 110 may include a charging portion 124 configured to engage the charging port 18 of the electric vehicle 10, and a handle 126 extending from the charging portion 124. The charging portion 124 may include a plurality of charging pins (not shown) configured to transfer current to the charging port 18 when the connector 110 engages the charging port 18. The handle 126 may extend obliquely from the charging portion 124 at an angle that is equal to an angle that the second portion 122 extends from the first portion 120 of the neck 114. In other words, the second portion 122 of the second portion 122 may extend colinear to the charging portion 124 of the connector 110.

The receiver 112 may include a receiver charging surface 130, an opposite lower surface 132, an outer radial surface 134 extending around the receiver charging surface 130, an indicator 136 provided on the receiver charging surface 130, an inner radial wall 138, and one or more receiver electrical contacts 140. The outer radial surface 134 may be fixed to the second end 118 of the neck 114. The inner radial wall 138 may extend from the receiver charging surface 130 to the lower surface 132 to define a receiver cavity 142 extending along an insertion axis 144. As depicted in FIGS. 2 and 3, the receiver cavity 142 may extend through the entirety of the receiver 112. However, it is contemplated and possible that the receiver cavity 142 may extend only partially through the receiver 112. The insertion axis 144 may extend perpendicularly through the receiver charging surface 130 so that the receiver charging surface 130 of the receiver 112 extends along a plane perpendicular to the insertion axis 144, and the insertion axis 144 may be circumferentially surrounded by the inner radial wall 138. In embodiments, the insertion axis 144 may extend parallel to the vertical direction (e.g., in the +/−Z direction). However, it is contemplated and possible that the insertion axis 144 may extend perpendicularly to the vertical direction, such as in the longitudinal direction (e.g., in the +/−Y direction) or the lateral direction (e.g., in the +/−X direction), or obliquely to the vertical direction to extend in a combination of the vertical direction, the lateral direction, and/or the longitudinal direction.

As depicted in FIGS. 2 and 3, the receiver cavity 142 may be shaped as a truncated cone having an upper end 146 at the receiver charging surface 130 and an opposite lower end 148 at the lower surface 132, the lower end 148 having a lower width extending across the receiver cavity 142 less than an upper width of the upper end 146 extending across the receiver cavity 142. However, it is contemplated and possible that the receiver cavity 142 has any shape capable of receiving the plunger 102, such as a cylinder.

The indicator 136 functions as a locator for locating the receiver cavity 142 relative to the indicator 136. For example, the indicator 136 may be a fiducial marking. The indicator 136 may be provided radially outside of an opening 150. The opening 150 extends through the receiver 112 that is sized and shaped to circumferentially surround the insertion axis 144, and surround the receiver cavity 142 to allow the plunger 102 to extend through the opening 150 into the receiver cavity 142. The indicator 136 may include a ferromagnetic material positioned at the receiver charging surface 130 of the receiver 112 that indicates a location of the receiver cavity 142 of the receiver 112. In embodiments, the indicator 136 may cover the entire receiver charging surface 130. The ferromagnetic material may engage with a magnet to retain the adapter 104 in contact with the plunger 102, as will be described in further detail herein.

The one or more receiver electrical contacts 140 may be provided on the inner radial wall 138 within the receiver cavity 142 and coupled thereto. Each of the receiver electrical contacts 140 may be arranged such that the receiver electrical contact 140 is ring-shaped and extends along the inner radial wall 138 to circumferentially surround the insertion axis 144. In embodiments, the receiver electrical contacts 140 may be canted coils. However, it is contemplated and possible that the receiver electrical contacts 140 may be any other traditional electrical contact positionable within the receiver cavity 142 and capable of transferring current to the charging portion 124.

The one or more receiver electrical contacts 140 may be electrically connected to the charging pins of the connector 110 via an electrical conduit that transfers current from the receiver electrical contacts 140 to the charging pins. The one or more receiver electrical contacts 140 may include a first electrical contact 152 and a second electrical contact 154. The first electrical contact 152 circumferentially surrounds the insertion axis 144 and is spaced apart from the receiver charging surface 130 by a first distance, and the second electrical contact 154 circumferentially surrounds the insertion axis 144 and is spaced apart from the receiver charging surface 130 by a second distance greater than the first distance.

In embodiments where the receiver cavity 142 is shaped as a truncated cone, the first electrical contact 152 and the second electrical contact 154 may each have a radius extending across the receiver cavity 142, the radius of the first electrical contact 152 being greater than the radius of the second electrical contact 154. However, in other embodiments where the receiver cavity 142 is shaped as a cylinder, the one or more electrical contacts may include a plurality of electrical contacts, each of the electrical contacts having a radius, the radius of the first electrical contact 152 being equal to the radius of the second electrical contact 154.

The plunger 102 may include a charging cable 160, an insertion member 162, one or more plunger electrical contacts 164, a locating member 166, and a locking mechanism 168. The charging cable 160 may include a first end 170 operatively coupled to the charging station 50 and an opposite second end 172. The charging cable 160 may further include an electrical conduit (not shown) extending from the first end 116 to the second end 118, the first end 116 being electrically connected to the charging station 50 to receive current from the charging station 50, and transfer the current to the second end 118, specifically the plunger electrical contacts 164.

The insertion member 162 may be operatively coupled to the second end 118 of the charging cable 160 to receive electrical current from the charging station 50. The insertion member 162 may include a plunger plate 174 and an insertion projection 176 extending from the plunger plate 174 away from the charging cable 160. The plunger plate 174 may include a receiver-facing surface 178 that is oriented along a plane extending perpendicular to the insertion axis 144, and a periphery 180 surrounding the receiver-facing surface 178.

The insertion projection 176 may include a first end 182 coupled to the receiver-facing surface 178 of the plunger plate 174, an opposite second end 184 spaced apart from the receiver-facing surface 178, and an outer radial surface 186 extending between the first end 116 and the second end 118. The insertion projection 176 may extend from the receiver-facing surface 178 of the plunger plate 174 along the insertion axis 144 defined by the receiver 112. The insertion projection 176 may be at least partially positionable into the receiver cavity 142 of the receiver 112. The insertion projection 176 may be sized and shaped to be positionable in the receiver cavity 142. As depicted in FIGS. 1-3, the insertion projection 176 is shaped as a truncated cone. However, it is contemplated and possible that the insertion projection 176 has other shapes, such as a cylinder, a triangle, a square, or the like.

The one or more plunger electrical contacts 164 may be provided on the insertion projection 176, such as positioned along the outer radial surface 186. The plunger electrical contacts 164 may be spaced apart from one another along the insertion projection 176 between the first end 182 and the second end 184. The plunger electrical contacts 164 may mate with the one or more receiver electrical contacts 140 when the insertion member 162 is positioned within the receiver cavity 142 to transfer current to the receiver electrical contacts 140. Each of the plunger electrical contacts 164 may be arranged such that the plunger electrical contact 164 is ring-shaped and extends along the outer radial surface 186 to circumferentially surround the insertion projection 176. In embodiments, the plunger electrical contacts 164 may be canted coils. However, it is contemplated and possible that the plunger electrical contacts 164 may be any other traditional electrical contact that is positionable around the insertion projection 176 and capable of transferring current to the receiver electrical contacts 140.

The plunger electrical contacts 164 may be electrically connected to the electrical conduit of the charging cable 160 so that the current from the charging station 50 may be transferred to the plunger electrical contacts 164. The plunger electrical contacts 164 may be formed of any material capable of transferring current between the charging station 50 and the receiver electrical contacts 140.

The locating member 166 may include one or more fingers 188 that extend obliquely from the periphery 180 of the plunger plate 174. The fingers 188 may extend at an angle and a distance such that the fingers 188 extend around the outer radial surface 134 of the receiver 112 when the insertion member 162 is positioned within the receiver cavity 142 of the receiver 112. The fingers 188 may act as a counterweight to orient the insertion projection 176 along the insertion axis 144 when the plunger 102 contacts the receiver 112, allowing the insertion projection 176 to be inserted into the receiver cavity 142. When the plunger 102 is engaged with the receiver 112, the fingers 188 may be spaced apart from the outer radial surface 134. The locating member 166 may have any operable number of fingers 188 for locating the insertion member 162 relative to the receiver 112, such as, for example, one, two, three, four, or more than four. In embodiments, the locating member 166 may have a single finger that extends entirely around the plunger plate 174 to be shaped as a cone extending around at least part of the outer radial surface 134. Accordingly, the locating member 166 may operate to align the plunger 102, and specifically the insertion projection 176, with the receiver cavity 142 of the receiver 112 upon contact of the locating member 166 with the receiver 112 as the plunger 102 is being lowered toward the receiver 112.

The locking mechanism 168 may engage the receiver charging surface 130 of the receiver 112 to retain the plunger 102 in contact with the receiver charging surface 130 when in a locked position. The locking mechanism 168 may include an electromagnet 190 that may be actuated to magnetically attract the indicator 136 of the adapter 104 to thereby retain the plunger 102 in contact with the receiver 112. However, it is contemplated and possible that the locking mechanism 168 includes a physical locking mechanism, such as a bayonet lock, for retaining the plunger 102 in contact with the receiver 112. In embodiments, it should be appreciated that the locating member 166 may provide physical locking in lieu of or in addition to locking by the locking mechanism 168.

The locking mechanism 168 may be provided on the receiver-facing surface 178 of the plunger plate 174 to face the receiver charging surface 130 and the indicator 136 of the receiver 112. The locking mechanism 168 may be operable between a locked position and an unlocked position, such that the locking mechanism 168 retains the insertion member 162 within the receiver cavity 142 when in the locked position and permit the insertion member 162 to be removed from the receiver cavity 142 when in the unlocked position. In the locked position, the locking mechanism 168 may be actuated to generate a magnetic force to attract the indicator 136 of the receiver 112 and attract the receiver 112 to the locking mechanism 168.

The plunger 102 may be movable between a disengaged position (FIG. 2) and an engaged position (FIG. 3). Referring to FIG. 2, in the disengaged position, the insertion member 162 of the plunger 102 may be spaced apart from the receiver 112. Referring to FIG. 3, in the engaged position, the insertion member 162 is positioned within the receiver cavity 142 of the receiver 112 such that the plunger electrical contacts 164 engage the receiver electrical contacts 140. In the engaged position, the charging station 50 may be activated to supply current to the receiver electrical contacts 140 through the plunger electrical contacts 164. Current may then be transferred through the connector 110 to the charging port 18 of the vehicle 10.

Referring to FIGS. 2-4, the gantry 106 may be operable to move the plunger 102 relative to the adapter 104 when the adapter 104 is positioned in the charging port 18 of the vehicle. The gantry 106 may span a plurality of parking spaces S in a parking structure to be operable to insert the plunger 102 into the adapter 104. The gantry 106 may include a gripper 200, a movement mechanism 202 coupled to the gripper 200, and an imaging device 204 for identifying the location of the receiver 112 of the adapter 104. The movement mechanism 202 may be operable for 3-axis movement to move the gripper 200 in any of the X-direction, the Y-direction, and the Z-direction. The gripper 200 may be fixedly coupled to the plunger 102 to move the plunger 102 with the gripper 200.

The depicted gantry 106 is a cable-driven parallel robot (CDPR), where the movement mechanism 202 includes a first motor 206, a first cable 208 operatively coupled to the first motor 206 and the gripper 200, a second motor 210, a second cable 212 operatively coupled to the second motor 210 and the gripper 200, a third motor 214, and a third cable 216 operatively coupled to the third motor 214 and the gripper 200. The motors 206, 210, 214 and cables 208, 212, 216 are oriented in different directions, with at least two of the motors 206, 210, 214 and respective cables 208, 212, 216 extending in both the X-direction and the Y-direction. In the depicted gantry 106, the first motor 206 is oriented so the first cable 208 extends in the X-direction and the Y-direction, and the second motor 210 is oriented so the second cable 212 extends in the X-direction and the Y-direction. Each of the motors 206, 210, 214 may take up and pay out the respective cable 208, 212, 216 to move the gripper 200 in any of the X-direction, the Y-direction, and the Z-direction. The charging cable 160 may extend from the charging station 50 with slack so that the plunger 102 is maneuverable between multiple vehicles in the plurality of parking spaces S. While the depicted gantry 106 is a CDPR, it is contemplated and possible that the gantry 106 may be any known robot or gantry 106 that can move in the X-direction, the Y-direction, and the Z-direction. For example, the gantry 106 may be a Delta robot, a SCARA robot, a cobot, an industrial robot, or the like.

The imaging device 204 may identify the location of the indicator 136 on the adapter 104. The gantry 106 may then move the gripper 200 via the movement mechanism 202 to the location of the indicator 136 when the gripper 200 is holding the plunger 102. The imaging device 204 may be any device capable of identifying the indicator 136 (FIG. 2), such as, for example, a camera. The imaging device 204 may be mounted on the gripper 200 so as to move with the gripper 200.

In some embodiments, the plunger 102 may be fixed to the gripper 200 so that the gantry 106 may charge a single vehicle at a time. However, it is contemplated and possible that there are a plurality of charging stations 50 and plungers 102 arranged about the plurality of parking spaces S, where the gripper 200 may selectively grip one of the plungers 102 and insert the plunger 102 into an adapter 104 of a respective vehicle. In further embodiments, a pair of charging stations 50 may be positioned on opposing sides of each parking space S to be able to charge vehicles that include a charging port 18 on either the driver side or the passenger side of the vehicle 10. In such embodiments, the gantry 106 may grip the plunger 102 attached to the charging station 50 on the side of the vehicle 10 that the charging port 18 is on, and insert that plunger 102 into the adapter 104.

Referring now to FIG. 5, the control system 108 may be operated in conjunction with the vehicle charging system 100, as well as any of the vehicle charging systems discussed herein. However, for brevity, the control system 108 will only be described with reference to the vehicle charging system 100. The control system 108 may include a controller 220 and a communication path 222 communicatively coupling the controller 220 to the first motor 206, the second motor 210, the third motor 214, the locking mechanism 168, the imaging device 204, and the charging station 50. The controller 220 includes a processor 224 and a non-transitory electronic memory 226 to which various components are communicatively coupled. In some embodiments, the processor 224 and the non-transitory electronic memory 226 and/or the other components are included within a single device. In other embodiments, the processor 224 and the non-transitory electronic memory 226 and/or the other components may be distributed among multiple devices that are communicatively coupled. The controller 220 includes non-transitory electronic memory 226 that stores a set of machine-readable instructions. The processor 224 executes the machine-readable instructions stored in the non-transitory electronic memory 226. The non-transitory electronic memory 226 may include RAM, ROM, flash memories, hard drives, or any device capable of storing machine-readable instructions such that the machine-readable instructions can be accessed by the processor 224. Accordingly, the control system 108 described herein may be implemented in any conventional computer programming language, as pre-programmed hardware elements, or as a combination of hardware and software components. The non-transitory electronic memory 226 may be implemented as one memory module or a plurality of memory modules.

The processor 224 may be any device capable of executing machine-readable instructions. For example, the processor 224 may be an integrated circuit, a microchip, a computer, or any other computing device. The non-transitory electronic memory 226 and the processor 224 are coupled to the communication path 222 that provides signal interconnectivity between various components and/or modules of the actuation system. Accordingly, the communication path 222 may communicatively couple any number of processors with one another, and allow the modules coupled to the communication path 222 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

As schematically depicted in FIG. 5, the communication path 222 communicatively couples the processor 224 and the non-transitory electronic memory 226 of the controller 220 with a plurality of other components of the control system 108. For example, the control system 108 depicted in FIG. 5 includes the processor 224 and the non-transitory electronic memory 226 communicatively coupled with the first motor 206, the second motor 210, the third motor 214, the locking mechanism 168, the imaging device 204, and the charging station 50. The controller 220 may be configured to actuate each of the first motor 206, the second motor 210, and the third motor 214 to move the gripper 200 in any of the X-direction, the Y-direction, and the Z-direction.

The controller 220 may be configured to receive a signal from the imaging device 204 indicative of a location of the indicator 136 relative to the gripper 200, and operate the motors 14 to move the gripper 200 into a position relative to the indicator 136. The controller 220 may position the gripper 200 such that the insertion member 162 of the plunger 102 is positioned along the insertion axis 144, and further operate the motors 206, 210, 214 to move the plunger 102 along the insertion axis 144 toward the receiver 112 until the insertion projection 176 is positioned in the receiver cavity 142, i.e., in the engaged position. Once the insertion projection 176 is positioned in the receiver cavity 142, the controller 220 may actuate the locking mechanism 168 to generate a magnetic force that attracts the indicator 136 on the receiver 112 to the electromagnet 190 on the plunger 102, thereby positioning the locking mechanism 168 into the locked position and retaining the insertion projection 176 within the receiver cavity 142. Once the locking mechanism 168 is actuated, the controller 220 may activate the charging station 50 to begin transferring current to the vehicle battery 16 through the plunger electrical contacts 164, the receiver electrical contacts 140, the charging pins on the connector 110, and the charging port 18.

Figure 6:
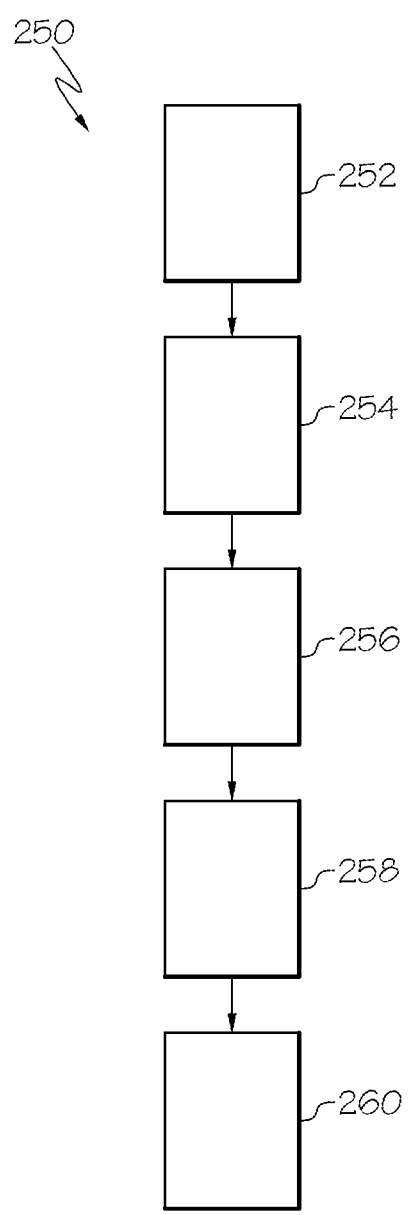
FIG. 6 depicts a flowchart for a method of operating the vehicle charging system of FIG. 1, according to one or more embodiments shown and described herein.

Referring now to FIG. 6, a flowchart of a method 250 of operating the vehicle charging system 100 is depicted with respect to the components described herein and illustrated in FIGS. 1-5. As discussed above, the vehicle 10 may be parked in a parking structure using an automated parking system that automatically parks the vehicle in a parking structure. The automated parking system may use a lift that picks up and transports the vehicle 10 to a parking space S in the parking structure. When the driver gets out of the vehicle 10 and before the automated parking system transports the vehicle 10 to the parking space, the driver may insert the adapter 104 into the charging port 18. Once the vehicle 10 is transported to the parking space, the method 250 may include, at step 252, detecting a location of the adapter 104 extending from the charging port 18 of the vehicle 10. The location may be detected by identifying the indicator 136 on the receiver 112 to locate the position of the receiver cavity 142, and moving the plunger 102 via the gantry 106 to align the insertion member 162 with the receiver cavity 142 in the receiver 112. The location of the adapter 104 may be detected using the imaging device 204 of the gantry 106 that identifies the indicator 136 on the receiver 112 and thereby locates the receiver cavity 142 of the receiver 112. The imaging device 204 may additionally be used to identify a side of the vehicle 10 that the adapter 104 is positioned on, such as the driver side or the passenger side of the vehicle 10.

At step 254, the method 250 may include positioning the plunger 102 relative to the adapter 104 such that the plunger 102 is positioned above the receiver 112 of the adapter 104 along the insertion axis 144. The plunger 102 may be positioned along the insertion axis 144 using the movement mechanism 202 of the gantry 106. At step 256, the method 250 may include lowering the plunger 102 along the insertion axis 144 such that the insertion projection 176 of the insertion member 162 is positioned within the receiver cavity 142 of the receiver 112 and the one or more plunger electrical contacts 164 of the plunger 102 engage the one or more receiver electrical contacts 140 of the receiver 112, thereby allowing current to flow from the plunger 102, through the adapter 104, and to the vehicle battery 16.

At step 258, the method 250 may include positioning the locking mechanism 168 into the locked position from the unlocked position to retain the insertion member 162 in contact with the receiver 112. In the locked position, the electromagnet 190 positioned on the receiver-facing surface 178 electromagnetically engages the receiver charging surface 130 of the receiver 112 to retain the insertion member 162 in contact with the receiver 112. At step 260, the method 250 may further include supplying an electrical current from the charging cable 160 through the plunger electrical contacts 164 to the receiver electrical contacts 140. The current may pass from the charging station 50 through the charging cable 160 and to the adapter 104 through the contact between the plunger electrical contacts 164 and the receiver electrical contacts 140. Once the electrical current is supplied to the adapter 104, the current may pass to the charging port 18 through connection with the connector 110, and charge the vehicle battery 16.

When either the vehicle battery 16 is fully charged, at a desired charge level, or the automated parking system begins a process of moving the vehicle 10, the vehicle charging system 100 may perform the above steps in reverse order to unplug the plunger 102 from the adapter 104. Particularly, the method 250 may include stopping the supply of electrical current, and operating the locking mechanism 168 from the locked position to the unlocked position. The method 250 may further include moving the plunger 102 along the insertion axis 144 away from the receiver 112 so that the insertion projection 176 is spaced apart from the receiver cavity 142. Once the plunger 102 is removed from the receiver cavity 142, the plunger 102 may be moved away from the adapter 104, and the vehicle 10 may be moved by the automated parking system.

Figure 7:
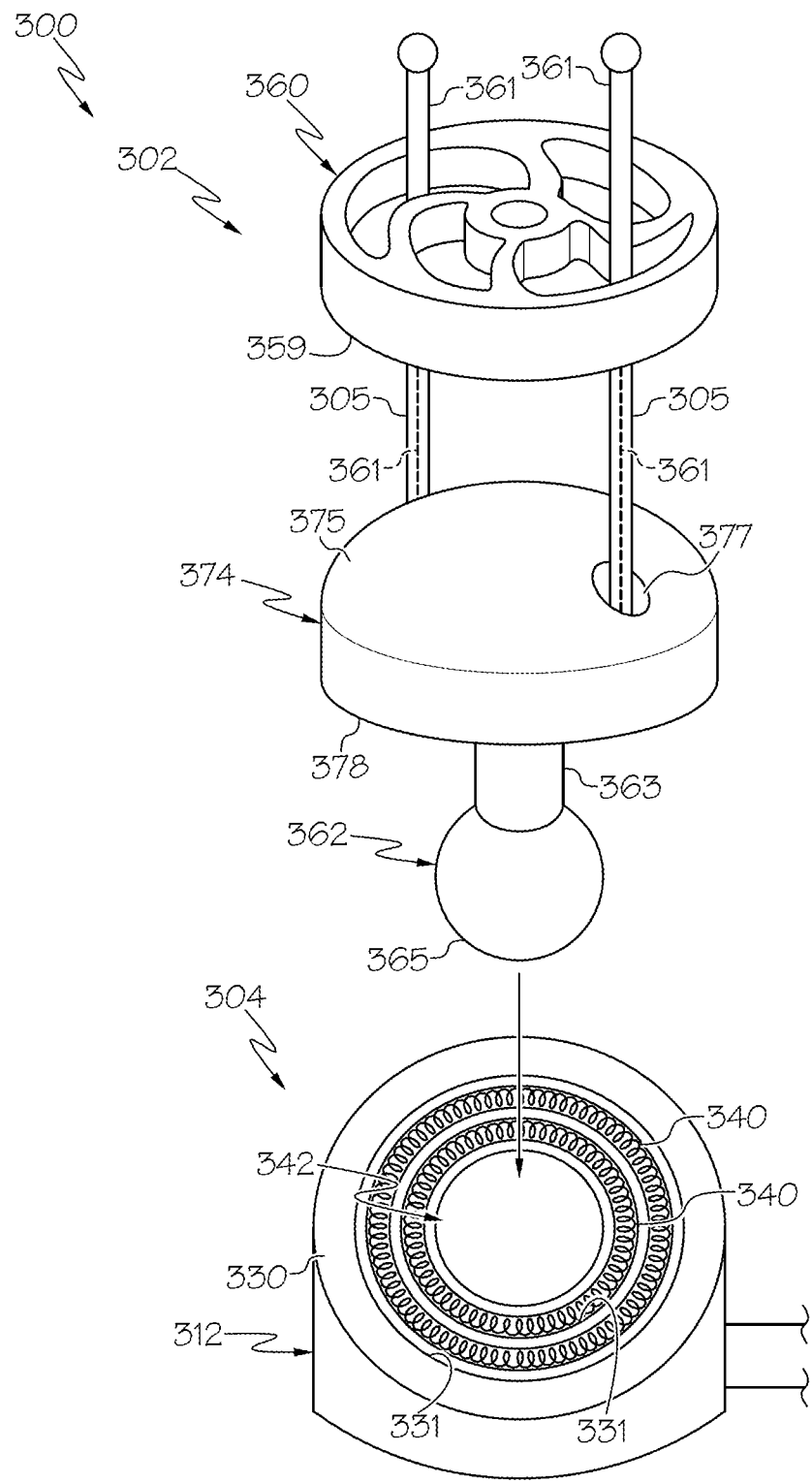
FIG. 7 schematically depicts an upper perspective view of another vehicle charging system in a disengaged position, according to one or more embodiments shown and described herein.
Figure 8:
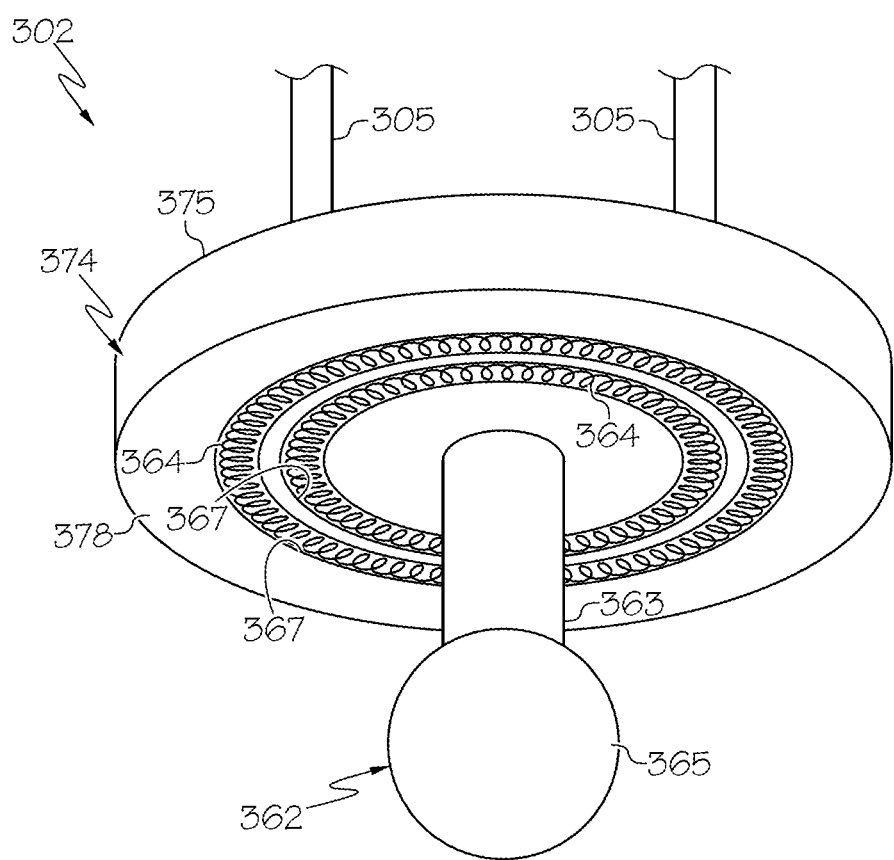
FIG. 8 schematically depicts a partial lower perspective view of a plunger of the vehicle charging system of FIG. 7, according to one or more embodiments shown and described herein.
Figure 9:
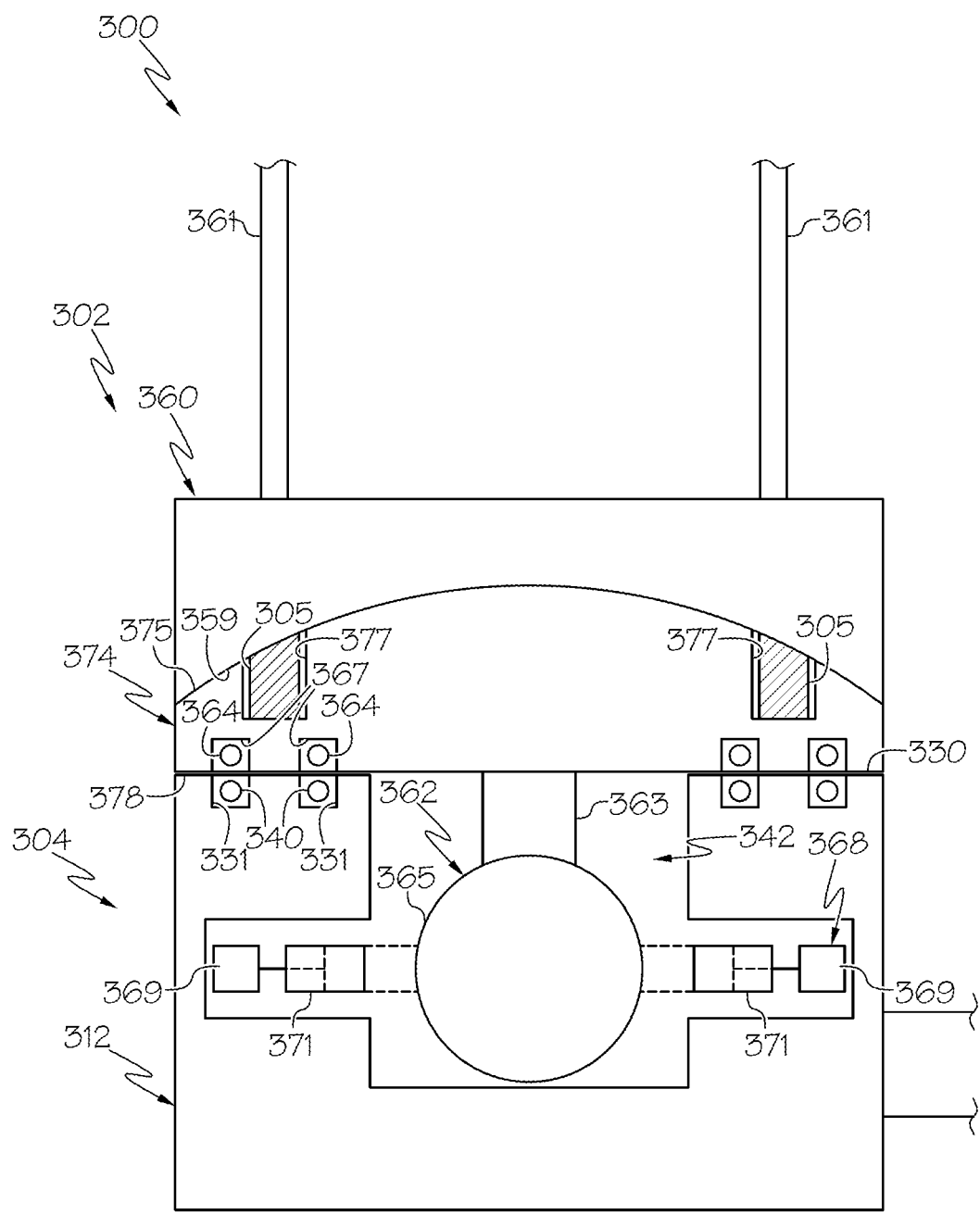
FIG. 9 schematically depicts a cross-sectional side view of the vehicle charging system of FIG. 7 in an engaged position, according to one or more embodiments shown and described herein.

Referring now to FIGS. 7-9, an alternative vehicle charging system 300 is depicted. It should be understood that the alternative vehicle charging system 300 is similar to the vehicle charging system 100 with the exceptions of the features described herein. As such, like features will use the same reference numerals with a prefix "3" for the reference numbers. As such, for brevity reasons, these features will not be described again.

The vehicle charging system 300 may include an alternative plunger 302 and an alternative adapter 304. The alternative plunger 302 may include a charging cable 360, a plunger plate 374, and one or more biasing members 305 extending between the charging cable 360 and the plunger plate 374. The plunger plate 374 may include a cable-facing surface 375, a receiver-facing surface 378, and an insertion member 362 extending from the receiver-facing surface 378. The cable-facing surface 375 may face the charging cable 360, and may be positioned opposite the receiver-facing surface 378. The plunger plate 374 may be convex at the cable-facing surface 375 such that the cable-facing surface 375 is curved. The plunger plate 374 may define a pair of cavities 377 that extend into the plunger plate 374 from the cable-facing surface 375 toward the receiver-facing surface 378.

The insertion member 362 may include an extension 363 and an insertion end 365 spaced apart from the receiver-facing surface 378 by the extension 363 that is coupled between the insertion end 365 and the receiver-facing surface 378. The insertion end 365 may be sized and shaped to be positioned in a receiver cavity 342 of the adapter 304. As depicted in FIGS. 7-9, the insertion end 365 may be a sphere. However, it is contemplated and possible that the insertion end 365 includes any shape capable of being positioned in the receiver cavity 342, such as, for example, a cube.

As shown in FIG. 8, the plunger plate 374 may define a pair of channels 367 formed within the receiver-facing surface 378 and extending into the plunger plate 374 that may receive one or more plunger electrical contacts 364. The pair of channels 367 may circumferentially surround the insertion member 362 and be sized and positioned such that one of the pair of channels 367 circumferentially surrounds the other of the pair of channels 367 with each of the pair of channels 367 being concentrically disposed. The one or more plunger electrical contacts 364 of the plunger 302 may positioned on the receiver-facing surface 378 within the pair of channels 367.

Referring again to FIGS. 7-9, the charging cable 360 may include a pair of charging wires 361 that extend from a terminal end surface 359 of the charging cable 360. The charging cable 360 may be concave at the terminal end surface 359 such that the terminal end surface 359 is curved to complement the shape of the cable-facing surface 375 of the plunger plate 374. The charging wires 361 are electrically coupled to the plunger electrical contacts 364 to transfer electrical current to the plunger electrical contacts 364. The biasing members 305 may extend from the terminal end 359 of the charging cable 360 to the plunger plate 374 and be coupled to the plunger plate 374. The biasing members 305 may at least partially extend into the pair of cavities 377 of the plunger plate 374. The pair of charging wires 361 may extend through the biasing members 305 with the biasing members 305 positioned around the pair of charging wires 361 between the charging cable 360 and the plunger plate 374. The pair of charging wires 361 may extend to be electrically coupled to the plunger electrical contacts 364. In embodiments, the biasing members 305 may include a pair of biasing members 305 with one of the pair of charging wires 361 extending through one of the pair of biasing members 305, and the other of the pair of charging wires 361 extending through the other of the pair of biasing members 305. It is contemplated and possible that the biasing members 305 include any number of biasing members 305, such as one, two, three, four, or more than four.

As shown in FIG. 9, when the plunger plate 374 contacts the alternative adapter 304, the charging cable 360 may be further moved toward the adapter 304 to bring the terminal end surface 359 of the charging cable 360 into contact with the cable-facing surface 375. The biasing members 305 may compress between the terminal end surface 359 and the cable-facing surface 375 so that the biasing members 305 are entirely positioned within the cavities 377 of the plunger plate 374.

Referring again to FIGS. 7-9, the alternative adapter 304 may include a receiver 312 with a receiver charging surface 330, a locking mechanism 368 (FIG. 9), and one or more receiver electrical contacts 340. The receiver 312 may define a pair of channels 331 formed within the receiver charging surface 330 and extending into the receiver 312 that may receive one or more receiver electrical contacts 340. The pair of channels 331 may circumferentially surround the receiver cavity 342. The one or more receiver electrical contacts 340 of the receiver 312 may be positioned on the receiver charging surface 330 within the pair of channels 331.

The one or more receiver electrical contacts 340 of the receiver 312 may be positioned on the receiver charging surface 330 of the receiver 312 such that the one or more plunger electrical contacts 364 and the one or more receiver electrical contacts 340 are positioned to contact one another when the insertion end 365 of the insertion member 362 is positioned within the receiver cavity 342 of the receiver 312, i.e., in the engaged position.

The locking mechanism 368 may be positioned in the receiver cavity 342, and may be operable between a locked position and an unlocked position. The locking mechanism 368 may grip the insertion end 365 when positioned within the receiver cavity 342 and the locking mechanism 368 is in the locked position to prevent the insertion end 365 from being removed from the receiver 312. The locking mechanism 368 may release the insertion end 365 to permit the insertion end 365 from being removed from the receiver 312 when the locking mechanism 368 is in the unlocked position. The locking mechanism 368 may include one or more actuators 369 operatively coupled to one or more locking members 371. The locking members 371 may be disposed on opposing sides of the insertion end 365. The actuators 369 may be actuated to move the locking members 371 into and out of contact with the insertion end 365 of the plunger 302 when the insertion end 365 is positioned in the receiver cavity 342. In the unlocked position, the locking members 371 may be spaced apart from the insertion end 365, and in the locked position (shown in phantom), the locking members 371 may contact the insertion end 365 to retain the insertion end 365 within the receiver cavity 342.

Figure 10:
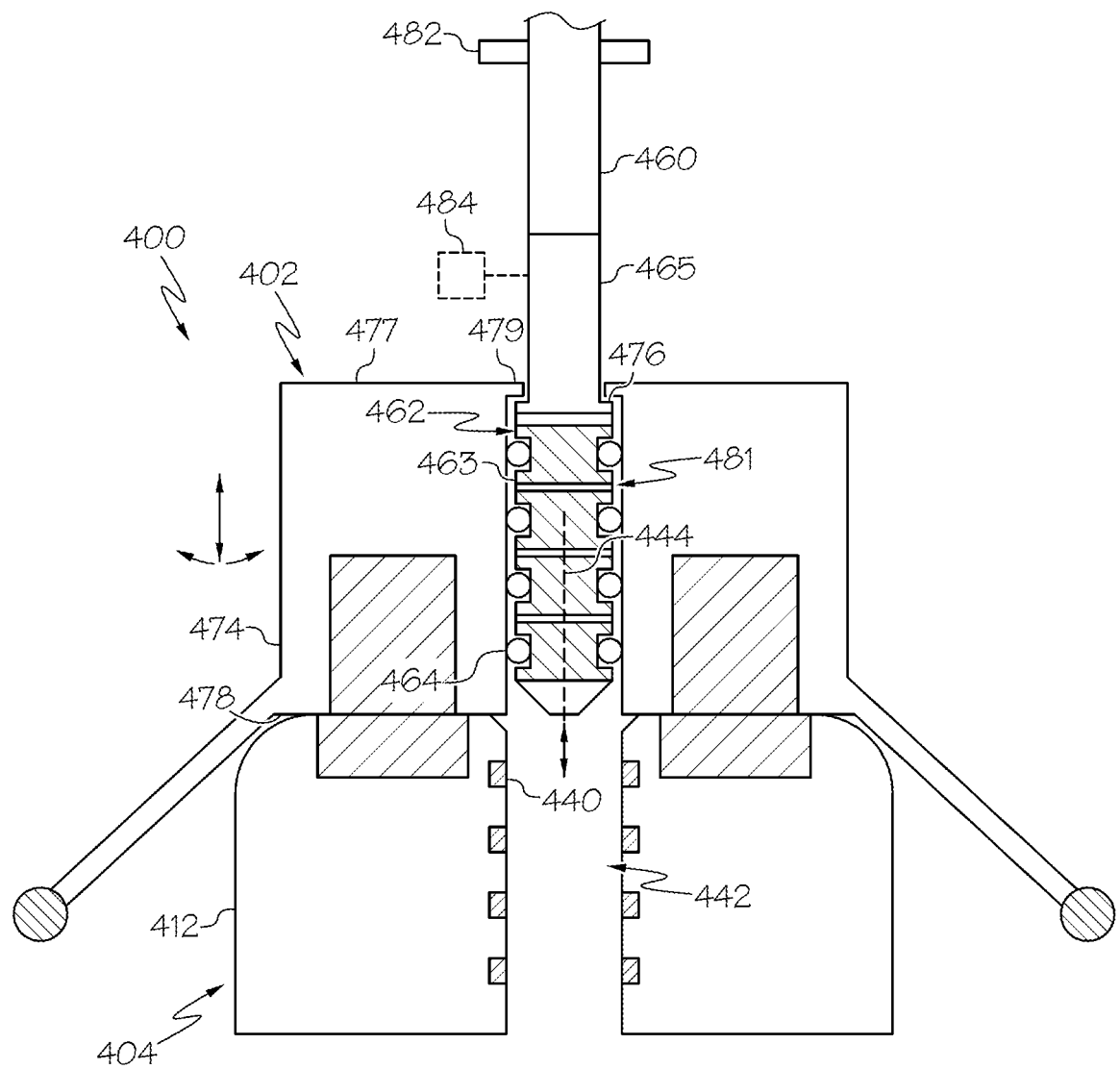
FIG. 10 schematically depicts a cross-sectional side view of another vehicle charging system in a disengaged position, according to one or more embodiments shown and described herein.
Figure 11:
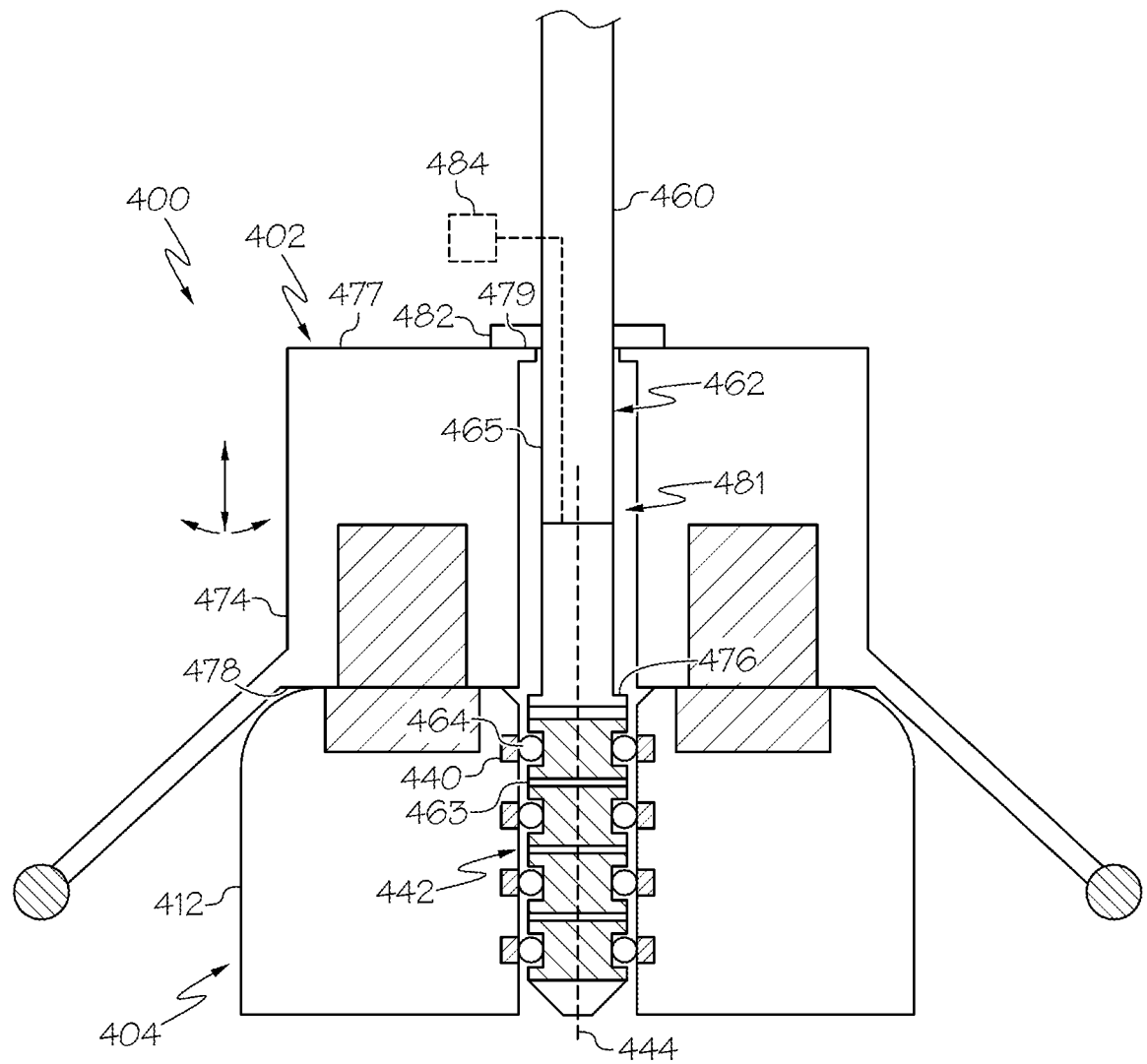
FIG. 11 schematically depicts a cross-sectional side view of the vehicle charging system of FIG. 10 in an engaged position, according to one or more embodiments shown and described herein.

Referring now to FIGS. 10 and 11, another alternative vehicle charging system 400 is depicted. It should be understood that the alternative vehicle charging system 400 is similar to the vehicle charging system 100 with the exceptions of the features described herein. As such, like features will use the same reference numerals with a prefix "4" for the reference numbers. As such, for brevity reasons, these features will not be described again.

The vehicle charging system 400 may include an alternative plunger 402 and an alternative adapter 404. The alternative plunger 402 may include a plunger plate 474 having an end surface 477, a receiver-facing surface 478 opposite the end surface 477, a flange 479, and a movable insertion member 462. The plunger plate 474 of the plunger 402 may define an opening 481 that extends from the receiver-facing surface 478 to the end surface 477. The flange 479 may extend radially inward and partially into the opening 481 to reduce a radius of the opening 481 at the end surface 477.

The insertion member 462 may include a charging portion 463 and a connection portion 465. The connection portion 465 may be fixedly coupled to the charging cable 460, and may be positioned between the charging cable 460 and the charging portion 463. The connection portion 465 may have a thickness that is less than a thickness of the charging portion 463 such that the insertion member 462 defines a contact surface 476. The thickness of the connection portion 465 may be less than the width of the opening 481 through the flange 479 such that the connection portion 465 may pass through the opening 481 at the flange 479. The charging portion 463 may have a width that is greater than the width of the opening 481 through the flange 479 such that the contact surface 476 may contact the flange 479 to prevent the charging portion 463 from passing through the opening 481 at the flange 479.

The connection portion 465 may be connected to the charging cable 460 so that movement of the charging cable 460 moves the insertion member 462, and contact between the contact surface 476 of the insertion member 462 and the plunger 402 moves the plunger plate 474 of the plunger 402 with the insertion member 462. The insertion member 462 may be movably positioned in the opening 481 of the plunger plate 474 such that the insertion member 462 may move relative to the plunger plate 474. The insertion member 462 may be extendable out of the opening 481 of the plunger 402 to extend into the receiver cavity 442 in the receiver 412 when the plunger 402 is positioned along the insertion axis 444.

The insertion member 462 may be movable between a disengaged position (FIG. 10) and an engaged position (FIG. 11). As shown in FIG. 10, in the disengaged position, the insertion member 462 is positioned within the opening 481 in the plunger plate 474 of the plunger 402 to be spaced apart from the receiver cavity 442. As shown in FIG. 11, in the engaged position, the charging portion 463 of the insertion member 462 is extended out of the opening 481 of the plunger plate 474 of the plunger 402 to be positioned in the receiver cavity 442 with the plunger electrical contacts 464 in contact with the receiver electrical contacts 440. The insertion member 462 may move relative to the plunger plate 474 of the plunger 402 when the plunger plate 474 contacts the receiver 412 and the charging cable 460 is further advanced toward the plunger plate 474 to move the insertion member 462 relative to the plunger plate 474. The charging cable 460 may be advanced until the charging portion 463 of the insertion member 462 is positioned in the receiver cavity 442 with the plunger electrical contacts 464 in contact with the receiver electrical contacts 440.

In embodiments, a stopper 482 may be provided on the charging cable 460 to prevent overextension of the charging cable 460 and the insertion member 462 into the receiver 412. The stopper 482 may circumferentially surround and extend from the charging cable 460 to have a width that is greater than a width of the receiver cavity 442 at the flange 479. The stopper 482 may be positioned on the charging cable 460 a distance from the charging portion 463 of the insertion member 462 such that the stopper 482 contacts the end surface 477 when the plunger electrical contacts 464 are in contact with the receiver electrical contacts 440.

In embodiments, an actuator 484 may be provided for positioning the insertion member 462 between the engaged position and the disengaged position. The actuator 484 may be operatively coupled to the charging cable 460 and/or the insertion member 462 to move the charging cable 460 and/or the insertion member 462 relative to the receiver 412.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle charging system comprising:
   a vehicle charging adapter comprising:
      a connector configured to engage with a charging port of a vehicle; and
      a receiver coupled to the connector, the receiver comprising:
         a receiver charging surface;
         an indicator provided on the receiver charging surface;
         an inner radial wall extending from the receiver charging surface and defining a receiver cavity extending along an insertion axis;
         one or more receiver electrical contacts electrically connected to the connector;
   a plunger comprising:
      an insertion member extending from a plunger plate along the insertion axis, the insertion member at least partially positionable into the receiver cavity of the receiver; and
      one or more plunger electrical contacts that mate with the one or more receiver electrical contacts when the insertion member is positioned within the receiver cavity; and
   a charging cable transferring electrical current to the one or more plunger electrical contacts of the plunger;
   wherein the plunger further comprises a locating member, the locating member comprises one or more fingers that extend around the receiver when the insertion member is positioned within the receiver cavity of the receiver.

2. The vehicle charging system of claim 1, wherein the plunger further comprises a locking mechanism operable between a locked position and an unlocked position, the locking mechanism retains the insertion member within the receiver cavity when in the locked position and permit the insertion member to be removed from the receiver cavity when in the unlocked position.

3. The vehicle charging system of claim 2, wherein the plunger plate is oriented along a plane extending perpendicular to the insertion axis, and the plunger further comprises an insertion projection extending from the plunger plate, the one or more plunger electrical contacts are provided on the insertion projection, and the locking mechanism is provided on a receiver-facing surface of the plunger plate, the locking mechanism electromagnetically engages the receiver charging surface of the receiver to retain the plunger plate in contact with the receiver charging surface when in the locked position.

4. The vehicle charging system of claim 1, wherein:
the plunger plate defines an opening, the insertion member is movable relative to the plunger plate between a disengaged position and an engaged position;
in the disengaged position, the insertion member is positioned within the opening in the plunger plate; and
in the engaged position, the insertion member is positioned within the receiver cavity.

5. The vehicle charging system of claim 4, wherein:
the insertion member comprises a charging portion and a connection portion, the connection portion is coupled to a charging cable, the insertion member defines a contact surface;
the plunger plate further comprises a flange extending partially into the opening; and
in the disengaged position, the contact surface of the insertion member contacts the flange.

6. The vehicle charging system of claim 1, wherein the plunger comprises a plunger plate having a receiver-facing surface and the insertion member extends from the receiver-facing surface and includes an insertion end spaced apart from the receiver-facing surface, the one or more plunger electrical contacts are positioned on the receiver-facing surface, the one or more receiver electrical contacts are positioned on the receiver charging surface of the receiver, the one or more plunger electrical contacts and the one or more receiver electrical contacts are positioned to contact one another when the insertion end of the insertion member is positioned within the receiver cavity of the receiver.

7. The vehicle charging system of claim 6, wherein the insertion end is a sphere, and the receiver includes a locking mechanism operable between a locked position and an unlocked position, the locking mechanism grips the insertion end when positioned within the receiver cavity and the locking mechanism is in the locked position to prevent the insertion end from being removed from the receiver, the locking mechanism releases the insertion end to permit the insertion end from being removed from the receiver when the locking mechanism is in the unlocked position.

8. The vehicle charging system of claim 7, wherein the plunger further comprises one or more biasing members extending between and coupled to a charging cable and the insertion member.

9. A method comprising:
detecting a location of an adapter extending from a charging port of a vehicle, the adapter comprising:
a connector configured to engage with the charging port of the vehicle;
a receiver comprising:
a receiver charging surface;
an indicator provided on the receiver charging surface;
an inner radial wall extending from the receiver charging surface and defining a receiver cavity extending along an insertion axis; and
one or more receiver electrical contacts electrically connected to the connector;
positioning a plunger relative to the adapter such that the plunger is positioned above the receiver of the adapter along the insertion axis, the plunger comprising:
an insertion member extending from a plunger plate along the insertion axis, the insertion member at least partially positionable into the receiver cavity of the receiver;
one or more plunger electrical contacts that mate with the one or more receiver electrical contacts when the insertion member is positioned within the receiver cavity; and
a charging cable transferring electrical current to the one or more plunger electrical contacts of the plunger;
wherein the plunger further comprises a locating member, the locating member comprising one or more fingers that extend around the receiver when the insertion member is positioned within the receiver cavity of the receiver; and
lowering the plunger along the insertion axis such that the insertion member is positioned within the receiver cavity of the receiver and the one or more plunger electrical contacts of the plunger engage the one or more receiver electrical contacts of the receiver.

10. The method of claim 9, further comprising supplying an electrical current from the charging cable through the plunger electrical contacts to the receiver electrical contacts.

11. The method of claim 9, further comprising positioning a locking mechanism into a locked position from an unlocked position to retain the insertion member in contact with the receiver, the locking mechanism comprising an electromagnet positioned on a receiver-facing surface of the plunger plate that electromagnetically engages the receiver charging surface of the receiver to retain the insertion member in contact with the receiver.

12. The method of claim 9, wherein locating the plunger relative to the adapter comprises identifying the indicator on the receiver to locate a position of the receiver cavity relative to the indicator, and moving the plunger via a gantry to align the insertion member with the receiver cavity in the receiver.

* * * * *